A. B. Dean,
Churn.

No. 93,285.   Patented Aug. 3. 1869.

Witnesses
James P Greves
Dennis D Rowe

Inventor
A. B. Dean
Chipman, Hosmer & Co
atty

United States Patent Office.

A. B. DEAN, OF LOUISVILLE, KENTUCKY.

Letters Patent No. 93,285, dated August 3, 1869.

---

IMPROVEMENT IN CHURNS.

---

The Schedule referred to in these Letters Patent and making part of the same.

---

*To all whom it may concern:*

Be it known that I, A. B. DEAN, of Louisville, in the county of Jefferson, and State of Kentucky, have invented a new and valuable Improvement in Churns; and I do hereby declare that the following is a full, clear, and exact description of the construction and operation of the same, reference being had to the annexed drawings, making a part of this specification, and to the letters and figures of reference marked thereon.

Figure 1 of the drawings is a front plan view of my invention.

My invention relates to churns; and

Figure 2:
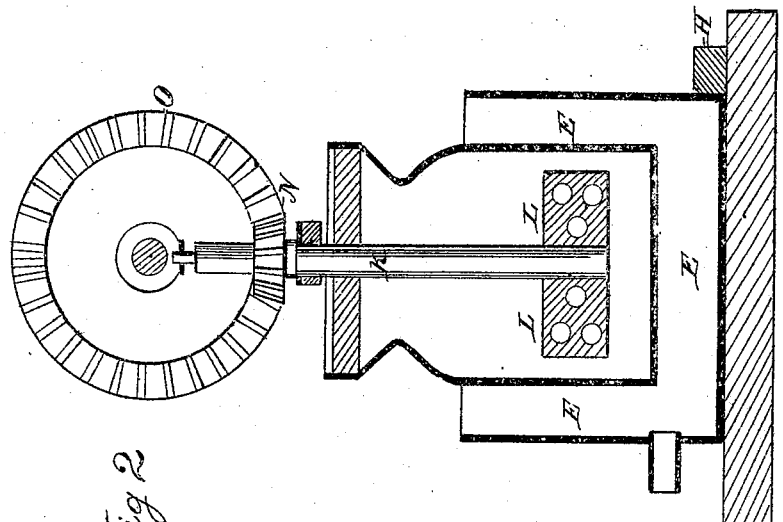
Figure 2 is a vertical section of the same.
Figure 3:
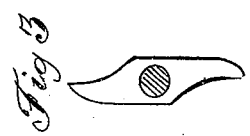
Figure 3 is a detail.
Figure 1:
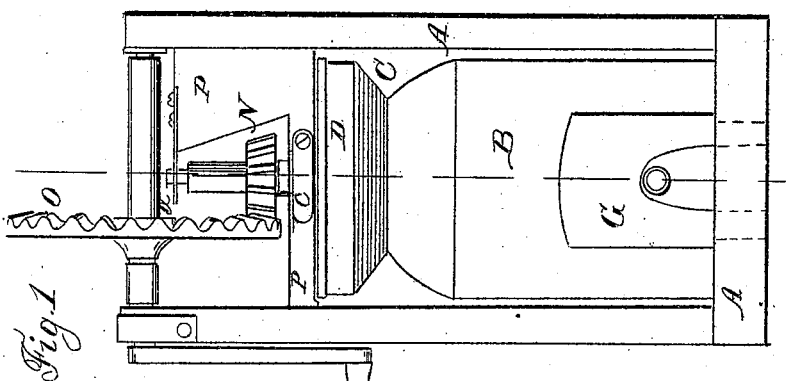

It consists, mainly, in a novel arrangement of devices intended to serve as efficient means for producing butter from milk or cream.

The letter A of the drawings, represents a frame having a pedestal and two upright pillars, as shown, and to which I attach the devices hereinafter mentioned.

The letter B represents my churn proper. It is usually constructed in a quadrangular form, with a neck at the point C, above which is arranged a recess for the cover, as shown at D.

The letters E represent a water-chamber, arranged as shown, on two sides and under the bottom of the churn proper. This water-chamber is used for regulating the temperature of the milk or cream in the churn, by the use of hot, cold, or tepid water.

The letter G represents a removable block, arranged upon the pedestal of the frame, and around the spout of the chamber E. This block, in conjunction with the slat H, upon the opposite side of the churn, serves as means for keeping the churn in place upon the pedestal, and also provides means for making the churn removable.

The letter K represents the rotating shaft, and letter L the dashers affixed thereto.

The letter N represents a bevelled pinion, attached to shaft K, and letter O the driving-wheel, arranged upon a crank-shaft, as shown, whose cogged teeth mesh and work with the teeth of pinion N.

The letter P represents a block, cut out as shown, to provide for the movements of pinion N. Said block is attached firmly to the pillars of the frame. It has an opening through its bottom, through which working-shaft K is passed, and a spring $a$, that serves as a rest and bearing for the top of said shaft.

The letter $c$ represents a button, pivoted to the side of block P, which serves as means for holding the shaft in place, and renders said shaft removable at will.

The cover of my churn is made in two sections, adapted to removal, and is fitted in the recess D.

What I claim as my invention, and desire to secure by Letters Patent, is—

The arrangement of the churn herein described, with the chamber E, blocks G and P, button $c$, slat H, and spring, $a$, substantially as specified.

In testimony that I claim the above, I have hereunto subscribed my name, in the presence of two witnesses.

A. B. DEAN.

Witnesses:
JOHN HENSELER,
WM. BOSWELL.